(12) United States Patent
Wang et al.

(10) Patent No.: US 10,564,511 B2
(45) Date of Patent: Feb. 18, 2020

(54) LIQUID CRYSTAL LENS AND LIQUID CRYSTAL GLASSES

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Haifeng Wang, Beijing (CN); Yongjun Yoon, Beijing (CN); Zhizhong Tu, Beijing (CN); Dasheng Hui, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 16/126,432

(22) Filed: Sep. 10, 2018

(65) Prior Publication Data
US 2018/0373116 A1     Dec. 27, 2018

Related U.S. Application Data

(63) Continuation-in-part of application No. 14/406,312, filed as application No. PCT/CN2014/073579 on Mar. 18, 2014, now abandoned.

(30) Foreign Application Priority Data

Nov. 15, 2013     (CN) .......................... 2013 1 0576312

(51) Int. Cl.
    *G02F 1/29*     (2006.01)
    *G02C 7/08*     (2006.01)
    *G02C 7/10*     (2006.01)

(52) U.S. Cl.
    CPC ............... *G02F 1/29* (2013.01); *G02C 7/101* (2013.01); *G02C 7/083* (2013.01); *G02F 2001/294* (2013.01); *G02F 2201/128* (2013.01)

(58) Field of Classification Search
    CPC combination set(s) only.
    See application file for complete search history.

(56) References Cited

U.S. PATENT DOCUMENTS

| | | | |
|---|---|---|---|
| 5,150,234 A | * | 9/1992 | Takahashi ................ G02B 3/14 349/1 |
| 6,859,333 B1 | | 2/2005 | Ren et al. |

(Continued)

FOREIGN PATENT DOCUMENTS

| | | |
|---|---|---|
| CN | 102305984 A | 1/2012 |
| CN | 102540558 A | 7/2012 |

(Continued)

OTHER PUBLICATIONS

First Office Action for Chinese Application No. 201310576312.2, dated Aug. 5, 2014, 7 Pages.

(Continued)

*Primary Examiner* — Lauren Nguyen
(74) *Attorney, Agent, or Firm* — Brooks Kushman P.C.

(57) ABSTRACT

The present disclosure provides a liquid crystal lens and liquid crystal glasses. The liquid crystal lens includes a cell defined by a first substrate and a second substrate arranged opposite to each other; a liquid crystal layer arranged between the first substrate and the second substrate and having a uniform thickness between the first substrate and the second substrate; a transparent pattern layer at an outside of the cell and having a curved top surface and a flat bottom surface in contact with the second substrate; and a second transparent electrode arranged at the curved top surface and at the outside of the cell.

20 Claims, 5 Drawing Sheets

(56) References Cited

U.S. PATENT DOCUMENTS

| | | |
|---|---|---|
| 2012/0038758 A1 | 2/2012 | Khassanov et al. |
| 2013/0037202 A1 | 2/2013 | Ando et al. |
| 2013/0077013 A1 | 3/2013 | Yamazaki et al. |
| 2016/0282636 A1 | 9/2016 | Wang et al. |

FOREIGN PATENT DOCUMENTS

| | | |
|---|---|---|
| CN | 102692744 A | 9/2012 |
| CN | 103119951 A | 5/2013 |
| CN | 202916525 U | 5/2013 |
| CN | 202929338 U | 5/2013 |
| CN | 203037968 U | 7/2013 |
| CN | 103592778 A | 2/2014 |
| CN | 203587904 U | 5/2014 |
| EP | 0785457 A2 | 7/1997 |
| EP | 2530511 A1 | 12/2012 |
| JP | S62161118 A | 7/1987 |
| JP | 2004184966 A | 7/2004 |
| WO | 2011093530 A1 | 8/2011 |
| WO | 2015070552 A1 | 5/2015 |

OTHER PUBLICATIONS

Second Office Action for Chinese Application No. 201310576312.2, dated Nov. 5, 2014, 5 Pages.
International Search Report and Written Opinion for Application No. PCT/CN2014/073579, dated Aug. 4, 2014, 11 Pages.

\* cited by examiner

LIQUID CRYSTAL LENS AND LIQUID CRYSTAL GLASSES

CROSS-REFERENCE TO RELATED APPLICATION

This application claims the benefit of and is a continuation-in-part of U.S. patent application Ser. No. 14/406,312 filed on Dec. 8, 2014, which is the U.S. national phase of PCT Application No. PCT/CN2014/073579 filed on Mar. 18, 2014, which claims the priority to Chinese Patent Application No. 201310576312.2 filed with the Chinese Patent Office on Nov. 15, 2013, the disclosures of which are hereby incorporated by reference in their entireties.

FIELD OF THE INVENTION

The present disclosure relates to the field of liquid crystal display technology, in particular to a liquid crystal lens and liquid crystal glasses.

DESCRIPTION OF THE PRIOR ART

FIG. 1 shows a basic structure of a liquid crystal spectacle, including a first substrate 101 and a second substrate 102 arranged opposite to each other to form a cell, and a liquid crystal layer 103 arranged between the first substrate 101 and the second substrate 102. The first substrate 101 includes a first transparent base plate 1011, and a first transparent electrode 1012 and a first alignment layer 1013 arranged sequentially on the first transparent base plate 1011. The second substrate 102 includes a second transparent base plate 1021, and a second transparent electrode 1022 and a second alignment layer 1023 arranged sequentially on the second transparent base plate 1021. The liquid crystal layer 103 is arranged between the first alignment layer 1013 and the second alignment layer 1023, and an initial alignment direction of liquid crystal molecules in the liquid crystal layer 103 is defined through the first alignment layer 1013 and the second alignment layer 1023.

In the related art, the second transparent electrode 1022 of the liquid crystal spectacle is divided into a plurality of regions, a constant voltage is applied to the first transparent electrode 1012 and different voltages are applied to the plurality of regions of the second transparent electrode 1022, so as to control the deflection of the liquid crystal molecules in the liquid crystal layer 103 at a certain angle, thereby changing reflective index. However, in order to apply different voltages to the plurality of regions of the second transparent electrode 1022, it is required to control the regions by means of a plurality of thin film transistors (TFTs). As a result, the liquid crystal spectacle has a complex structure.

SUMMARY OF THE INVENTION

One embodiment of the present disclosure is to provide a liquid crystal lens and liquid crystal glasses which can have a simple structure and adjust a focal length.

In order to achieve the above object, one embodiment of the present disclosure adopts following technical solutions.

In one aspect, a liquid crystal lens is provided and includes a first substrate and a second substrate arranged opposite to each other to form a cell, and a liquid crystal layer arranged between the first substrate and the second substrate. The first substrate includes a first transparent base plate, a first alignment layer arranged at a side of the first transparent base plate adjacent to the liquid crystal layer, and a first transparent electrode arranged between the first transparent base plate and the first alignment layer or arranged at a side of the first transparent base plate away from the liquid crystal layer. The second substrate includes a second transparent base plate, a second alignment layer arranged at a side of the second transparent base plate adjacent to the liquid crystal layer, a transparent pattern layer arranged at a side of the second transparent base plate away from the liquid crystal layer, and a second transparent electrode arranged at a side of the transparent pattern layer away from the second transparent base plate. The first alignment layer has an alignment direction parallel to an alignment direction of the second alignment layer. An upper surface of the transparent pattern layer and upper and lower surfaces of the second transparent electrode are arc surfaces, and the upper surface of the transparent pattern layer is in contact with the lower surface of the second transparent electrode.

Optionally, the arc surface is of a convex shape.

Optionally, the arc surface is of a concave shape.

Optionally, the first alignment layer and the second alignment layer are arranged immediately adjacent to the liquid crystal layer.

Optionally, the alignment directions of the first alignment layer and the second alignment layer are parallel to the substrates.

Alternatively, a spacer is arranged between the first substrate and the second substrate so as to maintain a distance between the first substrate and the second substrate.

In another aspect, one embodiment of the present disclosure provides a liquid crystal spectacle including the above-mentioned liquid crystal lenses and a frame.

Optionally, the liquid crystal lens further includes a color layer arranged at a side of a first alignment layer of a first substrate of the liquid crystal lens away from a liquid crystal layer, or at a side of a second alignment layer of a second substrate of the liquid crystal lens away from the liquid crystal layer. The liquid crystal lens corresponding to a left eye includes a first color layer, and the liquid crystal lens corresponding to a right eye includes a second color layer. The first color layer has a color different from, and complementary to, a color of the second color layer.

Further optionally, the first color layer and the second color layer are red and blue, or red and green, or blue and yellow, respectively.

Optionally, the liquid crystal lens further includes a polarizer arranged at a side of the first alignment layer of the first substrate of the liquid crystal lens away from the liquid crystal layer, or at a side of the second alignment layer of the second substrate of the liquid crystal lens away from the liquid crystal layer. The liquid crystal lens corresponding to the left eye includes a first polarizer, and the liquid crystal lens corresponding to the right eye includes a second polarizer. The first polarizer has a transmission axis direction perpendicular to a transmission axis direction of the second polarizer.

Further optionally, the transmission axis direction of the first polarizer or the second polarizer is consistent with an alignment direction of the alignment layer on the substrate where the polarizer is located.

Further, when the polarizer is arranged on the second substrate, the polarizer is arranged between the second alignment layer and a transparent pattern layer of the second substrate.

Optionally, the liquid crystal spectacle further includes a control module arranged on the frame and configured to control a voltage between a first transparent electrode and a second transparent electrode of the liquid crystal lens.

Optionally, the liquid crystal spectacle further includes an adjustment unit arranged on the frame and configured to adjust an output voltage of the control module.

Further, the liquid crystal lens includes at least one power source unit arranged inside the frame.

According to the liquid crystal lens and the liquid crystal spectacle of the present disclosure, the liquid crystal lens includes the first substrate and the second substrate arranged opposite to each other to form a cell, and the liquid crystal layer arranged between the first substrate and the second substrate. The first substrate includes the first transparent base plate, the first alignment layer arranged at a side of the first transparent base plate adjacent to the liquid crystal layer, and the first transparent electrode arranged between the first transparent base plate and the first alignment layer or at a side of the first transparent base plate away from the liquid crystal layer. The second substrate includes the second transparent base plate, the second alignment layer arranged at a side of the second transparent base plate adjacent to the liquid crystal layer, the transparent pattern layer arranged at a side of the second transparent base plate away from the liquid crystal layer, and the second transparent electrode arranged at a side of the transparent pattern layer away from the second transparent base plate. The first alignment layer has an alignment direction parallel to an alignment direction of the second alignment layer. The upper surface of the transparent pattern layer and the upper and lower surfaces of the second transparent electrode are arc ones, and the upper surface of the transparent pattern layer is in contact with the lower surface of the second transparent electrode.

Due to the existence of the transparent pattern layer, a gradient electric field which gradually changes from the center to the edge is formed between the first transparent electrode and the second transparent electrode, so as to gradually change deflection angles of the liquid crystal molecules in the liquid crystal layer and thereby changing the refractive index. As compared with the related art where the regions are controlled by TFTs so as to change the refractive index of the liquid crystal molecules in the liquid crystal layer, in the present disclosure, the refractive index of the liquid crystal molecules in the liquid crystal layer may be changed merely by setting a shape of the transparent pattern layer below the second transparent electrode, so a simpler structure is provided. In addition, by changing a voltage difference between the first transparent electrode and the second transparent electrode, the refractive index of the liquid crystal molecules in the liquid crystal layer may be changed to different extents, thereby adjusting the focal length.

BRIEF DESCRIPTION OF THE DRAWINGS

In order to illustrate technical solutions of the present disclosure or the related art more apparently, the drawings desired for the present disclosure or the prior art will be described hereinafter briefly. Obviously, the following drawings are merely some embodiments of the present disclosure, and a person skilled in the art may, without any creative effort, obtain other drawings based thereon.

REFERENCE SIGNS

Figure 1:
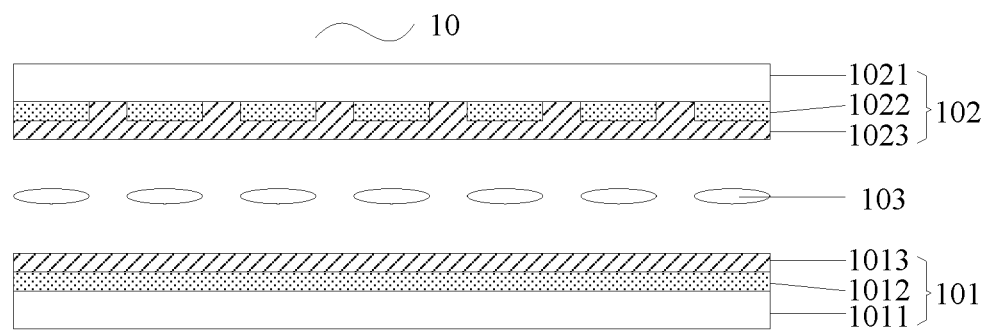
FIG. 1 is a schematic view showing a liquid crystal lens in the related art.

10 liquid crystal lens
101 first substrate
1011 first transparent base plate
1012 first transparent electrode
1013 first alignment layer
102 second substrate
1021 second transparent base plate
1022 second transparent electrode
1023 second alignment layer
1024 transparent pattern layer
103 liquid crystal layer
104 color layer
105 polarizer
20 frame
30 control module
40 adjustment unit
50 power source unit

DETAILED DESCRIPTION

The technical solutions of the embodiments of the present disclosure will be described hereinafter in a clear and complete manner in conjunction with the drawings. Obviously, the following embodiments are merely some rather than all of, the embodiments of the present disclosure. Based on these embodiments, a person skilled in the art may obtain other embodiments, which also fall within the scope of the present disclosure.

One embodiment of the present disclosure provides a liquid crystal lens 10. As shown in FIG. 2(a), FIG. 2(b) FIG. 3(a) and FIG. 3(b), the liquid crystal lens 10 includes a first substrate 101 and a second substrate 102 arranged opposite to each other to form a cell, and a liquid crystal layer 103 arranged between the first substrate 101 and the second substrate 102. The first substrate 101 includes a first transparent base plate 1011, a first alignment layer 1013 arranged at a side of the first transparent base plate 1011 adjacent to the liquid crystal layer 103, and a first transparent electrode 1012 arranged between the first transparent base plate 1011 and the first alignment layer 1013 or arranged at a side of the first transparent base plate 1011 away from the liquid crystal layer 103. The second substrate 102 includes a second transparent base plate 1021, a second alignment layer 1023 arranged at a side of the second transparent base plate 1021 adjacent to the liquid crystal layer 103, a transparent pattern layer 1024 arranged at a side of the second transparent base plate 1021 away from the liquid crystal layer 103, and a second transparent electrode 1022 arranged at a side of the transparent pattern layer 1024 away from the second transparent base plate 1021. In one embodiment, the first substrate 101 and the second substrate 102 are substantially parallel to each other, and the liquid crystal layer 103 has a uniform thickness between the first substrate 101 and the second substrate 102.

Figure 9:
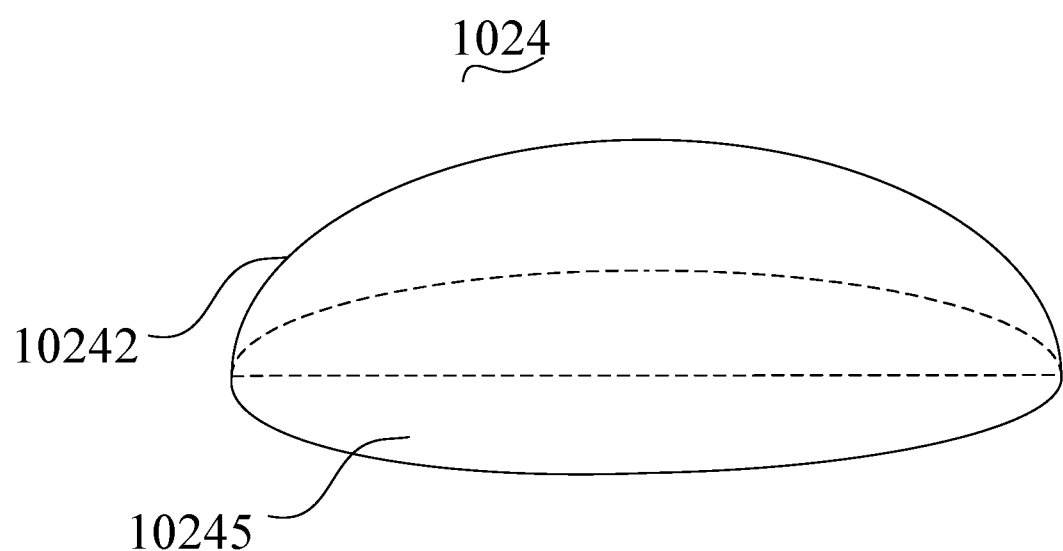
FIG. 9 is a schematic view of a transparent pattern layer according to one embodiment of the present disclosure.

The first alignment layer 1013 has an alignment direction parallel to an alignment direction of the second alignment layer 1023. An upper surface of the transparent pattern layer 1024 as well as upper and lower surfaces of the second transparent electrode 1022 are all arc surfaces, and the upper surface of the transparent pattern layer 1024 is in contact with the lower surface of the second transparent electrode 1022. In one embodiment as shown in FIG. 9, the transparent pattern layer 1024 has a curved top surface 10242 and a substantially flat bottom surface 10245. The curved top surface 10242 is a part of a spherical surface. The flat bottom surface 10245 is in contact with the second substrate 102. In some embodiment, the flat bottom surface 10245 may be in a direct contact with the second transparent base plate 1021 of the second substrate 102.

Here, when a voltage is applied to the first transparent electrode 1012 and the second transparent electrode 1022, an electric field is formed between the first transparent electrode 1012 and the second transparent electrode 1022. The intensity of the electric field is related to thicknesses, as well as dielectric constants of materials, of the transparent pattern layer 1024 and the liquid crystal layer 103 between the first transparent electrode 1012 and the second transparent electrode 1022. Because the upper surface of the transparent pattern layer 1024 is an arc surface while a lower surface of the transparent pattern layer 1024 opposite to the upper surface is a flat surface, the thickness of the transparent pattern layer 1024 changes from a middle portion towards an edge portion of the liquid crystal lens 10. When the transparent pattern layer 1024 has a large thickness, the transparent pattern layer 1024 have a relatively great influence on the intensity of the electric field, i.e., the transparent pattern layer 1024 has great capability of weakening the intensity of the electric field and thus cannot be omitted. When the transparent pattern layer 1024 has a small thickness, the transparent pattern layer 1024 has a relatively small influence on the intensity of the electric field, i.e., the transparent pattern layer 1024 has less capability of weakening the intensity of the electric field and thus may be omitted.

Specifically, the intensity of the electric field at the middle portion of the liquid crystal lens 10 is set as $E_{center}$, the intensity of the electric field at the edge portion of the liquid crystal lens 10 is set as $E_{border}$, a voltage applied between the first transparent electrode 1012 and the second transparent electrode 1022 is set as V, the thickness of the liquid crystal layer 103 is set as $d_{lc}$, the dielectric constant of liquid crystal molecules is set as $\varepsilon_{lc}$, the thickness of the transparent pattern layer 1024 is set as $d_{pattern}$, and the dielectric constant of the transparent pattern layer 1024 is set as $\varepsilon_{pattern}$.

In the case that the thickness of the transparent pattern layer 1024 decreases gradually from the middle portion towards the edge portion of the liquid crystal lens 10, the intensity of the electric field at the middle portion of the liquid crystal lens 10 is expressed as:

$$E_{center} = \frac{V/\varepsilon_{lc}}{\frac{d_{lc}}{\varepsilon_{lc}} + \frac{d_{pattern}}{\varepsilon_{pattern}}};$$

and the intensity of the electric field at the edge portion of the liquid crystal lens 10 is expressed as:

$$E_{border} = \frac{V/\varepsilon_{lc}}{d_{lc}/\varepsilon_{lc}} = \frac{V}{d_{lc}}.$$

As can be seen from the above formulas, in the case that the thickness of the transparent pattern layer 1024 decreases gradually from the middle portion to the edge portion of the liquid crystal lens 10, the intensity of the electric field at the middle portion of the liquid crystal lens 10 is relatively small, while the intensity of the electric field at the edge portion of the liquid crystal lens 10 is relatively large. Hence, a gradient electric field, whose intensity increases gradually from the middle portion towards the edge portion of the liquid crystal lens 10, is formed between the first transparent electrode 1012 and the second transparent electrode 1022.

Similarly, in the case that the thickness of the transparent pattern layer 1024 increases gradually from the middle portion towards the edge portion of the liquid crystal lens 10, the intensity of the electric field at the middle portion of the liquid crystal lens 10 is relatively large, while the intensity of the electric field at the edge portion of the liquid crystal lens 10 is relatively small. Hence, a gradient electric field, whose intensity decreases gradually from the middle portion towards the edge portion of the liquid crystal lens 10, is formed between the first transparent electrode 1012 and the second transparent electrode 1022.

Based on the above, the working principle of the liquid crystal lens 10 according to one embodiment of the present disclosure is: when the voltage is applied to the first transparent electrode 1012 and the second transparent electrode 1022, the gradient electric field, whose intensity increases or decreases gradually from the middle portion towards the edge portion of the liquid crystal lens 10, is formed between the first transparent electrode 1012 and the second transparent electrode 1022, so as to deflect the liquid crystal molecules in the liquid crystal layer 103, located in the gradient electric field, at a certain angle under the effect of the gradient electric field, and to increase or decrease gradually the deflection angle along with an increase or decrease of the intensity of the electric field, thereby changing refractive index.

It should be appreciated that, firstly, the first alignment layer 1013 and the second alignment layer 1023 shall be arranged immediately adjacent to the liquid crystal layer 103, so as to control initial alignment directions of the liquid crystal molecules.

When the first alignment layer 1013 has an alignment direction parallel to an alignment direction of the second alignment layer 1023, the initial alignment directions of the liquid crystal molecules are identical. As a result, it is able to prevent the deflection angles of the liquid crystal molecules from increasing or decreasing erratically under the effect of the gradient electric field due to the inconsistent initial alignment directions.

In addition, the alignment directions of the first alignment layer 1013 and the second alignment layer 1023 are parallel to the substrate. As a result, the alignment direction of the liquid crystal molecules in the liquid crystal layer 103 is also parallel to the substrate. However, due to the limitation of the actual process level, there may probably be a tiny angle between the alignment direction of the alignment layer and the substrate.

Secondly, the transparent pattern layer 1024 may be etched by, but not limited to, exposing it to UV light. The transparent pattern layer 1024 may be made of a transparent material such as resin and polymers, as long as it may be shaped into an arc surface after the etching. Hence, the material of the transparent pattern layer will not be particularly defined herein.

In addition, it should be appreciated that, the upper surface of the transparent pattern layer 1024 is in contact with the lower surface of the second transparent electrode 1022, so the arc lower surface of the second transparent electrode 1022 is opened downward when the arc upper surface of the transparent pattern layer 1024 is opened downward (i.e., its upper surface is a convex one), and the arc upper surface of the second transparent electrode 1022 is opened downward too. Similarly, when the arc upper surface of the transparent pattern layer 1024 is opened upward (i.e., its upper surface is a concave one), the upper and lower surfaces of the second transparent electrode 1022 are opened upward too.

Thirdly, the first transparent electrode 1012 may be arranged between the first transparent base plate 1011 and the first alignment layer 1013, or at a side of the first transparent base plate 1011 away from the liquid crystal layer 103. The position of the first transparent electrode 1012 shall be subject to the actual structure of the liquid crystal lens 10. However, in order to protect the electrode, the first transparent electrode 1012 is optionally arranged between the first transparent base plate 1011 and the first alignment layer 1013.

Fourthly, between the first substrate 101 and the second substrate 102 is provided not only the liquid crystal layer 103 but also a spacer for maintaining a distance therebetween. The liquid crystal layer 103 may be filled with positive, nematic liquid crystals. The first substrate 101 and the second substrate 102 may be arranged opposite to each to form a cell by means of a sealant.

According to one embodiment of the present disclosure, the liquid crystal lens 10 includes the first substrate 101 and the second substrate 102 arranged opposite to each other to form a cell, and the liquid crystal layer 103 arranged between the first substrate 101 and the second substrate 102. The first substrate 101 includes the first transparent base plate 1011, the first alignment layer 1013 arranged at a side of the first transparent base plate 1011 adjacent to the liquid crystal layer 103, and the first transparent electrode 1012 arranged between the first transparent base plate 1011 and the first alignment layer 1013 or arranged at a side of the first transparent base plate 1011 away from the liquid crystal layer 103. The second substrate 102 includes the second transparent base plate 1021, the second alignment layer 1023 arranged at a side of the second transparent base plate 1021 adjacent to the liquid crystal layer 103, the transparent pattern layer 1024 arranged at a side of the second transparent base plate 1021 away from the liquid crystal layer 103, and the second transparent electrode 1022 arranged at a side of the transparent pattern layer 1024 away from the second transparent base plate 1021. The first alignment layer 1013 has an alignment direction parallel to an alignment direction of the second alignment layer 1023. The upper surface of the transparent pattern layer 1024 and upper and lower surfaces of the second transparent electrode 1022 are all arc surfaces, and the upper surface of the transparent pattern layer 1024 is in contact with the lower surface of the second transparent electrode 1022.

Due to the existence of the transparent pattern layer 1024, the gradient electric field which changes from the center to the edge is formed between the first transparent electrode 1012 and the second transparent electrode 1022, so as to change the deflection angle of the liquid crystal molecules in the liquid crystal layer 103 and thereby changing the refractive index. As compared with the related art where the regions are controlled by TFTs so as to change the refractive index of the liquid crystal molecules in the liquid crystal layer, in one embodiment of the present disclosure, the refractive index of the liquid crystal molecules in the liquid crystal layer may be changed merely by setting a shape of the transparent pattern layer 1024 below the second transparent electrode 1022, so a simpler structure may be provided. In addition, by changing a voltage difference between the first transparent electrode 1012 and the second transparent electrode 1022, the refractive index of the liquid crystal molecules in the liquid crystal layer 103 may be changed to different extents, thereby adjusting a focal length.

Figure 2A:
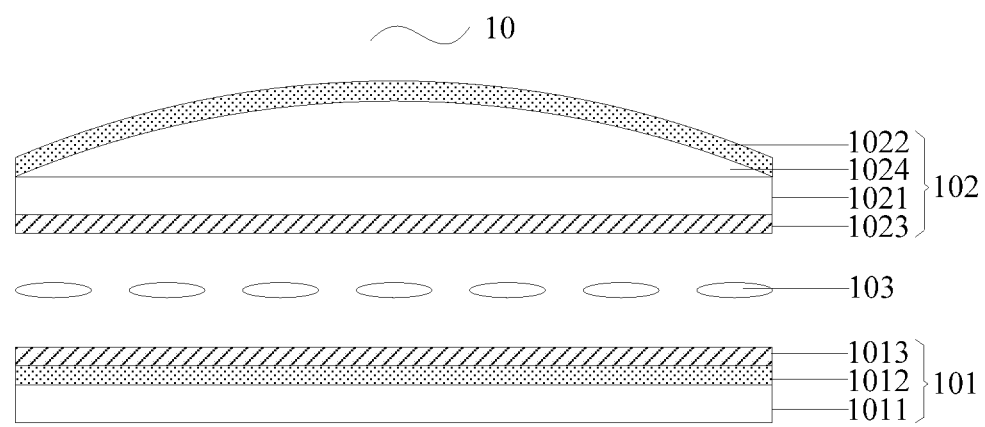
FIG. 2(a) is a schematic view showing a liquid crystal lens according to one embodiment of the present disclosure.
Figure 2B:
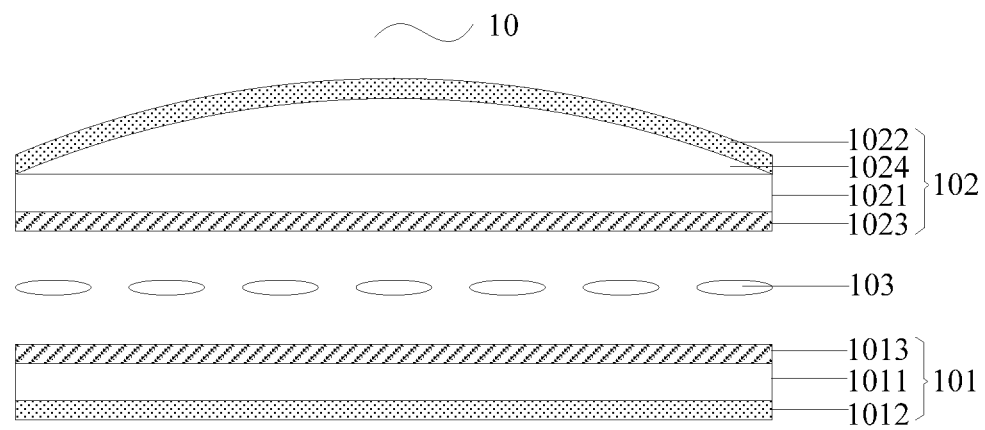
FIG. 2(b) is another schematic view showing the liquid crystal lens according to one embodiment of the present disclosure.
Figure 3A:
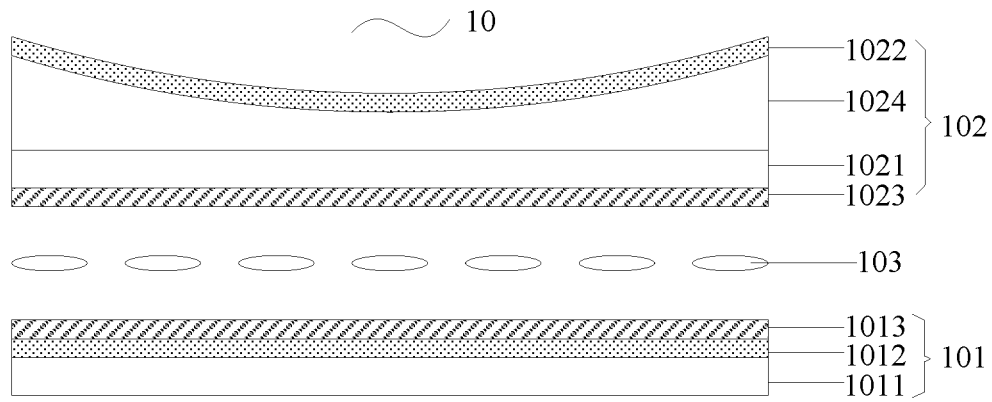
FIG. 3(a) is yet another schematic view showing the liquid crystal lens according to one embodiment of the present disclosure.
Figure 3B:
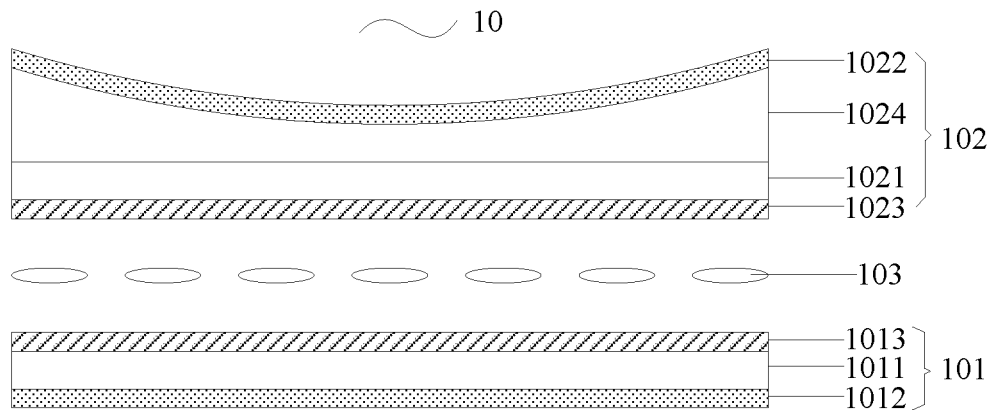
FIG. 3(b) is still yet another schematic view showing the liquid crystal lens according to one embodiment of the present disclosure.

Optionally, referring to FIG. 2(a) and FIG. 2(b), a contact surface of the transparent pattern layer 1024 with the second transparent electrode 1022 is of a convex shape, and the second transparent electrode 1022 is an arc one.

When no voltage is applied to the first transparent electrode 1012 and the second transparent electrode 1022 of the liquid crystal lens 10, all portions of the liquid crystal lens 10 have the same refractive index due to the consistent alignment direction of the liquid crystal molecules in the liquid crystal layer 103. As a result, the light from the outside may pass through the liquid crystal lens 10 easily, and at this time, the liquid crystal lens 10 is a flat one.

Figure 4:
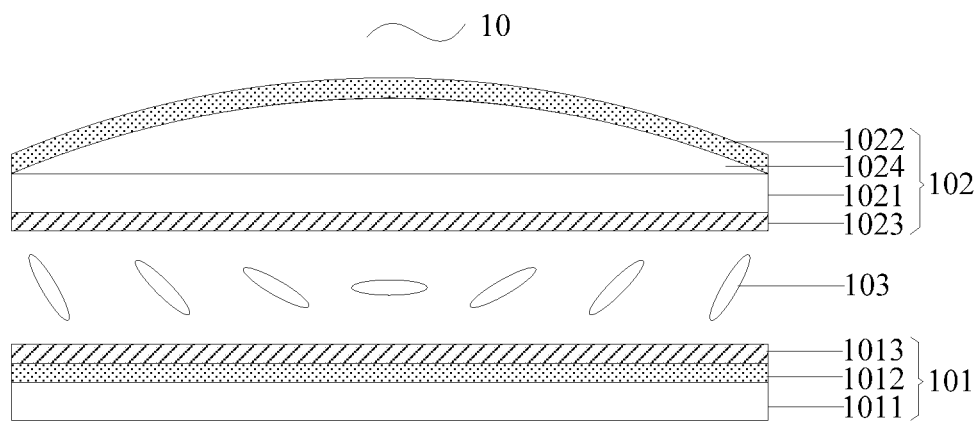
FIG. 4 is a schematic view showing the working principle of a myopic liquid crystal lens according to one embodiment of the present disclosure.

When the voltage is applied to the first transparent electrode 1012 and the second transparent electrode 1022 of the liquid crystal lens 10, as shown in FIG. 4, the intensity of the electric field between the first transparent electrode 1012 and the second transparent electrode 1022 increases gradually from the middle portion towards the edge portion of the liquid crystal lens 10 since the thickness of the transparent pattern layer 1024 decreases gradually from the middle portion towards the edge portion of the liquid crystal lens 10. As a result, the deflection angles of the liquid crystal molecules in the liquid crystal layer 103 increase gradually from the middle portion towards the edge portion of the liquid crystal lens 10. The liquid crystal molecules in the middle of the liquid crystal lens 10 are substantially not be deflected or deflected at a tiny deflection angle due to the very small intensity of the electric field. The deflection angles of the liquid crystal molecules increase along with an increase in the intensity of the electric field from the middle portion towards the edge portion of the liquid crystal layer 103. Such a gradient arrangement of the liquid crystal molecules enables the liquid crystal layer 103 to function as a concave lens. The light from the outside may be scattered when it passes through the liquid crystal lens 10, thus the liquid crystal lens 10 may function as a myopic lens.

Based on the above, when the voltage applied to the first transparent electrode 1012 and the second transparent electrode 1022 is changed, a voltage difference therebetween may be changed too. The resultant electric field distribution as well as the deflection degree of the liquid crystal molecules may be different. As a result, the light from the outside is scared to different extents when it passes through the liquid crystal lens 10, thereby adjusting the focal length of the myopic liquid crystal lens 10.

Optionally, referring to FIG. 3(*a*) and FIG. 3(*b*), the contact surface of the transparent pattern layer 1024 with the second transparent electrode 1022 may be a concave one, and the second transparent electrode 1022 may be an arc one.

When no voltage is applied to the first transparent electrode 1012 and the second transparent electrode 1022 of the liquid crystal lens 10, all portions of the liquid crystal lens 10 have the same refractive index due to the consistent alignment direction of the liquid crystal molecules in the liquid crystal layer 103. As a result, the light from the outside may pass through the liquid crystal lens 10 easily, and at this time the liquid crystal lens 10 is a flat one.

Figure 5:
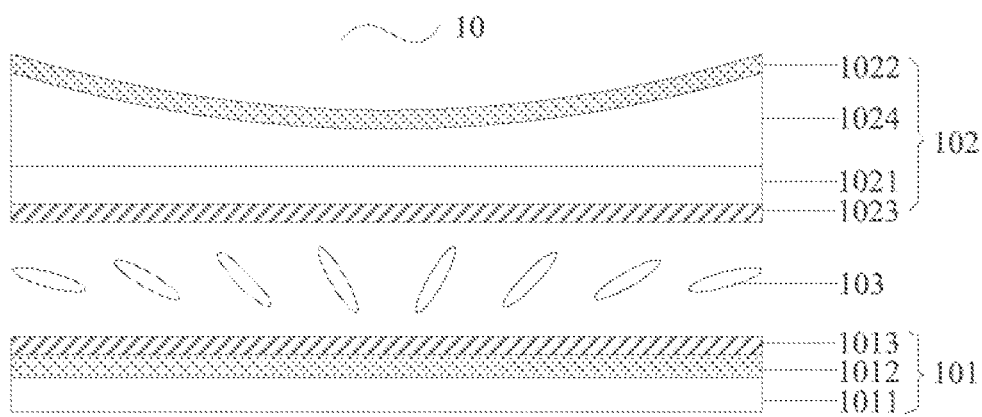
FIG. 5 is a schematic view showing the working principle of a presbyopic liquid crystal lens according to one embodiment of the present disclosure.

When the voltage is applied to the first transparent electrode 1012 and the second transparent electrode 1022 of the liquid crystal lens 10, as shown in FIG. 5, the intensity of the electric field between the first transparent electrode 1012 and the second transparent electrode 1022 decreases gradually from the middle portion towards the edge portion of the liquid crystal lens 10 sine the thickness of the transparent pattern layer 1024 increases gradually from the middle portion towards the edge portion of the liquid crystal lens 10. As a result, the deflection angles of the liquid crystal molecules in the liquid crystal layer 103 decrease gradually from the middle portion towards the edge portion of the liquid crystal lens 10. The liquid crystal molecules at an extreme edge of the liquid crystal lens 10 are substantially not deflected or deflected at a small deflection angle due to the very small intensity of the electric field. The deflection angles of the liquid crystal molecules increase along with an increase in the intensity of the electric field from the edge portion to the middle portion of the liquid crystal lens 10. Such a gradient arrangement of the liquid crystal molecules enables the liquid crystal layer 103 to function as a convex lens. The light from the outside may be focused when it passes through the liquid crystal lens 10, and as a result, the liquid crystal lens 10 may function as a presbyopic lens.

Based on the above, when the voltage applied to the first transparent electrode 1012 and the second transparent electrode 1022 is changed, the voltage difference between the first transparent electrode 1012 and the second transparent electrode 1022 is changed too. The resultant electric field distribution may be different. The deflection degrees of liquid crystal molecules may also be different. As a result, it is able to focus the light from the outside to different extents when it passes through the liquid crystal lens 10, thereby adjusting a focal lens of the presbyopic liquid crystal lens 10.

Figure 6:
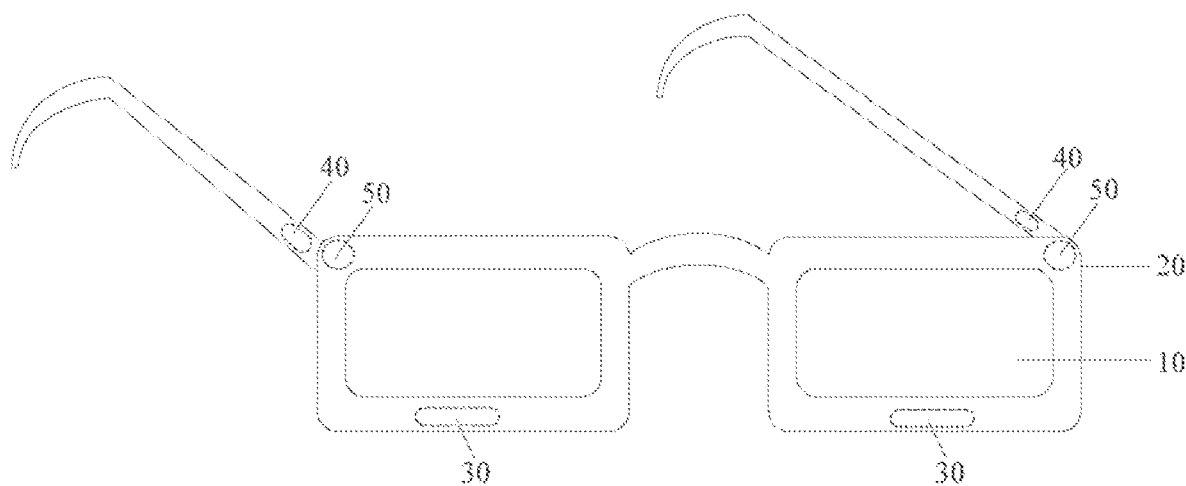
FIG. 6 is a schematic view showing a liquid crystal spectacle according to one embodiment of the present disclosure.

One embodiment of the present disclosure further provides a liquid crystal spectacle which, as shown in FIG. 6, includes the above-mentioned liquid crystal lens 10 and a frame 20.

Because the focal length of the liquid crystal lens 10 may be adjusted by controlling the deflection angle of the liquid crystal molecules therein, referring to FIG. 6, optionally, the liquid crystal spectacle may further include a control module 30 arranged inside the frame 20. The control module 30 is configured to control a voltage between the first transparent electrode 1012 and the second transparent electrode 1022.

Further, optionally, referring to FIG. 6, the liquid crystal spectacle may further include an adjustment unit 40 arranged on the frame 20. The adjustment unit 40 is connected to the control module 30 and configured to adjust an output voltage of the control module 30.

Further, as shown in FIG. 6, the liquid crystal spectacle may include at least one power source unit 50 configured to supply voltages to the control unit 30 and the other members to which the power is required to be supplied. The at least one power source unit 50 is arranged inside the frame 20.

Here, in the case of at least one power source unit 50, they may be arranged in series inside the frame 20.

According to the liquid crystal spectacle having a focal length adjustment function in one embodiment of the present disclosure, the adjustment unit 40 may adjust the output voltage of the control module 30, so as to control the voltage applied between the first transparent electrode 1012 and the second transparent electrode 1022 and change the refractive index of the liquid crystal molecules in the liquid crystal layer 103 to different extents, thereby adjusting the focal length. As a result, it is able to meet the demands of different users, i.e., to adjust degrees of the liquid crystal spectacle at any time.

Figure 7A:
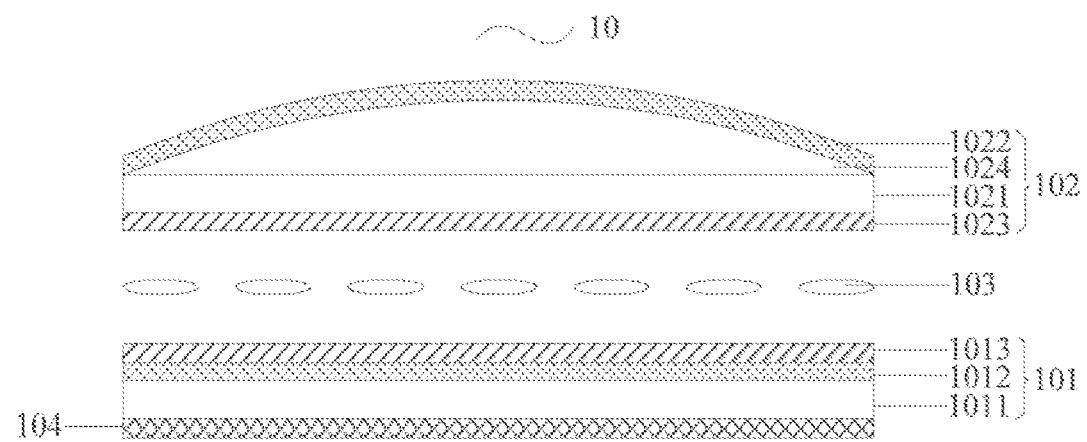
FIG. 7(a) is a schematic view showing an anaglyphic 3D liquid crystal spectacle according to one embodiment of the present disclosure.
Figure 7B:
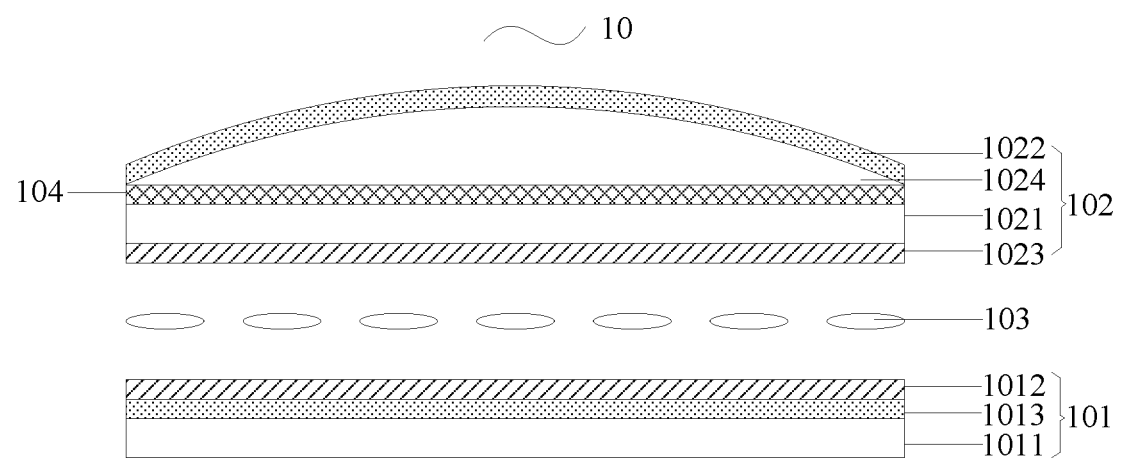
FIG. 7(b) is another schematic view showing the anaglyphic 3D liquid crystal spectacle according to one embodiment of the present disclosure.

Based on the above, as shown in FIG. 7(*a*) and FIG. 7(*b*), a color layer 104 may further be arranged inside the liquid crystal lens 10 having the focal length adjustment function. The color layer 104 may be arranged at a side of the first alignment layer 1013 of the first substrate 101 away from the liquid crystal layer 103, or at a side of the second alignment layer 1023 of the second substrate 102 away from the liquid crystal layer 103. The liquid crystal lens 10 corresponding to a left eye includes a first color layer, and the liquid crystal lens 10 corresponding to a right eye includes a second color layer. The first color layer has a color different from, and complementary to, a color of the second color layer.

In the case that the color layer 104 is arranged on the first substrate 101, referring to FIG. 7(*a*), the color layer 104 may be arranged at any position at a side of the first alignment layer 1013 of the first substrate 101 away from the liquid crystal layer 103.

Specifically, when the first transparent electrode 1012 of the first substrate 101 is arranged between the first transparent base plate 1011 and the first alignment layer 103, the color layer 104 may be arranged between the first transparent base plate 1011 and the first transparent electrode 1012, or between the first transparent electrode 1012 and the first alignment layer 1013, or at a side of the first transparent base plate 1011 away from the liquid crystal layer 103.

When the first transparent electrode 1012 of the first substrate 101 is arranged at a side of the first transparent base plate 1011 away from the liquid crystal layer 103, the color layer 104 may be arranged between the first transparent base plate 1011 and the first transparent electrode 1012, or between the first transparent base plate 1011 and the first alignment layer 1013.

In the case that the color layer 104 is arranged on the second substrate 102, referring to FIG. 7(*b*), the color layer 104 may be arranged at a side of the second alignment layer 1023 of the second substrate 102 away from the liquid crystal layer 103. Optionally, the color layer 104 is arranged at any position between the second alignment layer 1023 of the second substrate 102 and the transparent pattern layer 1024.

In other words, the color layer 104 may be arranged between the second transparent base plate 1021 and the second alignment layer 1023 of the second substrate 102, or between the second transparent base plate 1021 and the transparent pattern layer 1024.

It should be appreciated that, the color layer 104 may be arranged at various positions, which will not be particularly defined herein. However, in order to facilitate the manufacture, the color layer 104 is optionally arranged at the outermost side of the first transparent base plate 1011 of the first substrate 101 away from the liquid crystal layer 103. In addition, in one embodiment, the liquid crystal lens 10 corresponding to the left eye is optionally of an identical structure to the liquid crystal lens 10 corresponding to the right eye, as long as the color layers 104 have the colors complementary to each other.

The complementary colors will be explained hereinafter. When two kinds of rays (monochromatic rays or polychromatic rays) are mixed at an appropriate ratio so as to produce a sense of white color, the two colors are call as "complementary colors". For example, red and cyan, green and magenta, or blue and green, may be call as "complementary colors". However, in common sense, the rays of a certain color may have a certain range of wavelength, e.g., cyan rays are a combination of blue rays and green rays, and the rays having the wavelength between those of blue rays and the green rays may be considered as cyan rays. Hence, red and blue, or red and green, may also be considered as complementary colors.

Based on the above, the first color layer and the second color layer may be red and blue, or red and green, or blue and yellow.

As mentioned above, the liquid crystal spectacle has the functions of adjusting the focal length and viewing a 3D image, and thus is an anaglyphic 3D liquid crystal spectacle. For the anaglyphic 3D liquid crystal spectacle, two images taken at different viewing angles are combined as an identical image at different colors, and the colors are filed by the corresponding 3D spectacle so that the different images viewed by the two eyes overlap in the human brain to achieve a 3D stereo effect.

Specifically, taking a red-blue 3D spectacle as an example, when an image taken by a left camera passes through a red lens (the left eye), red pixels that are filtered out during the photographing is recovered automatically, so as to generate an image with true colors at a certain angle. When the image taken by the left camera passes through a blue lens (the right eye), it is filtered out mostly, leaving a very dim image that is easily omitted by the human brain. In contrast, when an image taken by a right camera passes through the blue lens (the right eye), blue pixels that are filtered out during the photographing is recovered automatically, so as to generate another image with true colors at another angle. When the image taken by the right camera passes through the red lens (the left eye), it is filtered out mostly, leaving a very dim image that is easily omitted after it is transmitted to the human brain by means the eye. As a result, the different images viewed by the left and right eyes overlap in the brain so as to achieve the stereo effect.

It should be appreciated that, the anaglyphic 3D spectacle is necessarily used in combination with a display device. In other words, when the 3D spectacle is, e.g., a red-blue spectacle, the display device necessarily display corresponding red and blue images.

Figure 8:
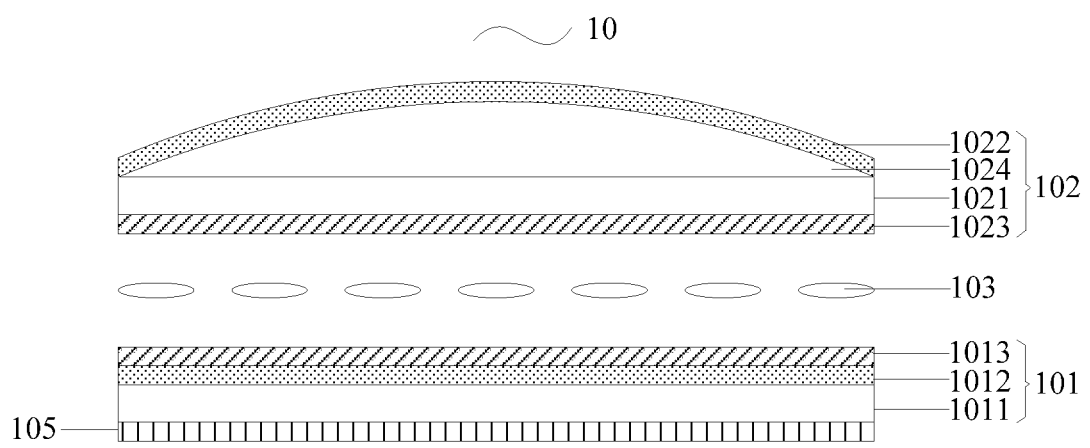
FIG. 8 is a schematic view showing a polarized 3D liquid crystal spectacle according to one embodiment of the present disclosure.

Of course, as shown in FIG. 8, a polarizer 105 may further be arranged inside the liquid crystal lens 10 having the focal length adjustment function. The polarizer 105 may be arranged at a side of the first alignment layer 1013 of the first substrate 101 of the liquid crystal lens 10 away from the liquid crystal layer 103, or at a side of the second alignment layer 1023 of the second substrate 102 of the liquid crystal lens 10 away from the liquid crystal layer 103. The liquid crystal lens 10 corresponding to the left eye includes a first polarizer, and the liquid crystal lens 10 corresponding to the right eye includes a second polarizer. The first polarizer has a transmission axis direction perpendicular to a transmission axis direction of the second polarizer, and optionally the transmission axis direction of the first polarizer or the second polarizer is consistent with an alignment direction of the alignment layer on the substrate where the polarizer is located.

Here, when the polarizer 105 is arranged on the first substrate 101, the polarizer 105 may optionally be arranged at the outermost side of the first alignment layer 1013 of the first substrate 101 away from the liquid crystal layer 103, and the transmission axis direction of the polarizer 105 is consistent with the alignment direction of the first alignment layer 1013 of the first substrate 101.

When the polarizer 105 is arranged on the second substrate 102, the polarizer 105 may be arranged between the second alignment layer 1023 and the transparent layer 1024 of the second substrate 102, so as to ensure a flat polarizer 105 and facilitate the manufacture thereof.

Based on the above, the liquid crystal spectacle has the functions of adjusting the focal length and viewing the 3D image, and thus is a polarized 3D liquid crystal lens. For the polarized 3D spectacle, two images taken at different viewing angles are filtered by two polarizers perpendicular to each other, respectively, to form polarized rays with their polarization directions perpendicular to each other, and then the polarized rays with different polarization directions are filtered out by the corresponding 3D spectacle, so that the different images viewed by the two eyes overlap in the human brain so as to as achieve the 3D stereo effect.

Specifically, two cameras, i.e., a left one and a right one, may be used to take a stereo image. The image taken by the left camera is filtered out by a transverse polarizer to obtain transversely polarized rays. The image taken by the right camera is filtered out by a vertical polarizer to obtain vertically polarized rays. When the polarized rays with different polarization directions pass through the lenses with the transverse polarizer (left eye) and the vertical polarizer (right eye), respectively, the transversely polarized rays may merely pass through the transverse polarizer (left eye) and the vertically polarized rays may merely pass through the vertical polarizer (right eye). As a result, it may be ensured that the image taken by the left camera may merely enter the left eye while the image taken by the right camera may merely enter the right eye, and the different images viewed by the left and right eyes overlap in the human brain so as to achieve the stereo effect.

It should be appreciated that, the polarized 3D spectacle is necessarily used in combination with a display device. As a result, when the 3D spectacle is a polarized one, the display device necessarily displays the images formed by the polarized rays perpendicular to each other.

The working procedure of the polarized 3D liquid crystal spectacle having the focal length adjustment function will be described hereinafter with an example.

The polarized 3D liquid crystal spectacle includes two liquid crystal lenses 10, the frame 20, the control module 30 arranged on the frame 20, the adjustment unit 40 connected to the control module 30, and the power source unit 50.

Each liquid crystal lens 10 includes the first substrate 101 and the second substrate 102 arranged opposite to each other to form a cell, and the liquid crystal layer 103 arranged between the first substrate 101 and the second substrate 102. The first substrate 101 includes the first transparent base plate 1011, the first alignment layer 1013 arranged at a side of the first transparent base plate 1011 adjacent to the liquid crystal layer 103, the first transparent electrode 1012 arranged between the first transparent base plate 1011 and the first alignment layer 1013, and the polarizer 105 arranged at a side of the first transparent base plate 1011 away from the liquid crystal layer 103. The second substrate 102 includes the second transparent base plate 1021, the second alignment layer 1023 arranged at a side of the second transparent base plate 1021 adjacent to the liquid crystal layer 103, the transparent pattern layer 1024 arranged at a side of the second transparent pattern layer 1024 away from the liquid crystal layer 103, and the second transparent electrode 1022 arranged at a side of the transparent pattern layer 1024 away from the liquid crystal layer 103.

The upper surface of the transparent pattern layer 1024 is in contact with the lower surface of the second transparent electrode 1022, and the contact surface is a convex, arc one. The second transparent electrode 1022 is of a shape identical to the arc upper surface of the transparent pattern layer 1024. The first alignment layer 1013 of the liquid crystal lens 10 has an alignment direction parallel to an alignment direction of the second alignment layer 1023, and the alignment directions of the first alignment layer 1013 and the second alignment layer 1023 are consistent with the transmission axis direction of the polarizer 105.

Here, the polarizer of the liquid crystal lens 10 corresponding to the left eye may be called as the first polarizer while the polarizer of the liquid crystal lens 10 corresponding to the right eye may be called as the second polarizer, and the transmission axis direction of the first polarizer is perpendicular to that of the second polarizer. In this case, the first alignment layer 1013 and the second alignment layer 1023 of the liquid crystal lens 10 corresponding to the left eye have alignment directions perpendicular to alignment directions of the first alignment layer 1013 and the second alignment layer 1023 of the liquid crystal lens 10 corresponding to the right eye.

For example, when a myopic user wears the polarized 3D liquid crystal spectacle to view 3D video and it is required to adjust the focal length of the liquid crystal lens 10, the following steps may be performed.

Step S101: wearing, by the user, the polarized 3D liquid crystal spectacle.

At this time, no voltage is applied between the two electrodes of the liquid crystal lens 10.

Step S102: pressing, by the user, the adjustment unit 40 on the frame 20 to enable the adjustment function.

Here, the adjustment unit 40 is a rotatable adjustment unit.

The control unit 30 may output a constant voltage to the first transparent electrode 1012, and the adjustment unit 40 may control the control module 30 to output an adjustable voltage to the second transparent electrode 1022.

In this case, the adjustment unit 40 may be adjusted so as to generate a certain voltage difference between the first transparent electrode 1012 and the second transparent electrode 1022. Thus, a gradient electric field whose intensity increases gradually from the middle portion towards the edge portion of the liquid crystal lens 10, is generated so as to control the deflection angle of the liquid crystal molecules in the liquid crystal layer 103 to increase gradually from the middle portion towards the edge portion of the liquid crystal lens 10, thereby obtaining the 3D liquid crystal spectacle corresponding to a certain focal length.

Step S103: when the user believes that the focal length obtained in Step S102 is suitable, pressing again the adjustment unit 40 so as to disable the adjustment function; and when the user believes that the focal length obtained in Step S102 cannot meet his requirement, continuing to adjust the adjustment unit until a suitable focal length is obtained, and then pressing again the adjustment unit 40 so as to disable the adjustment function.

When the adjustment unit 40 controls the control module 30 to output a larger voltage to the second transparent electrode 1022, the intensity of the gradient electric field between the first transparent electrode 1012 and the second transparent electrode 1022 is increased, and the deflection angles of the liquid crystal molecules in the liquid crystal layer 103 are increased too. As a result, the focal length of the liquid crystal spectacle may be increased.

Through the above Steps S101 to S103, the polarized 3D liquid crystal spectacle with a suitable focal length may be obtained. As a result, it is able to enable the myopic user to view the 3D video, avoid the need for the user to wear two pairs of spectacles, and adjust the degrees of the spectacle in accordance with the users' requirements.

The above are merely the optional embodiments of the present disclosure, but the scope of the present disclosure is not limited thereto. A person skilled in the art may make further alterations or substitutions without departing from the spirit of the present disclosure, and these alterations or substitutions shall also fall within the scope of the present disclosure. Hence, the scope of the present disclosure shall be subject to the appended claims.

What is claimed is:

1. A liquid crystal lens, comprising:
a cell defined by a first substrate and a second substrate arranged opposite to each other; wherein the first substrate comprises a first transparent base plate, a first alignment layer arranged at the first transparent base plate and within the cell, and a first transparent electrode arranged at the first transparent base plate; the second substrate comprises a second transparent base plate, and a second alignment layer arranged at the second transparent base plate and within the cell;
a liquid crystal layer arranged between the first substrate and the second substrate and having a uniform thickness between the first substrate and the second substrate;
a transparent pattern layer at an outside of the cell; wherein the transparent pattern layer has a curved top surface and a substantially flat bottom surface, the flat bottom surface is in direct contact with the second transparent base plate of the second substrate; and
a second transparent electrode arranged directly at the curved top surface and at the outside of the cell.

2. The liquid crystal lens according to claim 1, wherein the whole transparent pattern layer is at the outside of the cell.

3. The liquid crystal lens according to claim 2, wherein the curved top surface is a continuous smooth curved surface.

4. The liquid crystal lens according to claim 3, wherein the curved top surface is of a convex shape.

5. The liquid crystal lens according to claim 3, wherein the transparent pattern layer has a thickness that decreases gradually from a middle portion of the liquid crystal lens towards each edge portion of the liquid crystal lens;
an intensity of an electric field at the middle portion of the liquid crystal lens is expressed as:

$$E_{center} = \frac{V/\varepsilon_{lc}}{\frac{d_{lc}}{\varepsilon_{lc}} + \frac{d_{pattern}}{\varepsilon_{pattern}}};$$

an intensity of an electric field at the edge portion of the liquid crystal lens is expressed as:

$$E_{border} = \frac{V/\varepsilon_{lc}}{d_{lc}/\varepsilon_{lc}} = \frac{V}{d_{lc}}$$

where $E_{center}$ represents the intensity of the electric field at the middle portion of the liquid crystal lens; $E_{border}$ represents the intensity of the electric field at the edge portion of the liquid crystal lens; V represents a voltage applied between the first transparent electrode and the second transparent electrode; $d_{lc}$ represents a thickness of the liquid crystal layer; $\varepsilon_{lc}$ represents a dielectric constant of liquid crystal molecules of the liquid crystal layer; $d_{pattern}$ represents the thickness of the transparent pattern layer; and $\varepsilon_{pattern}$ represents a dielectric constant of the transparent pattern layer.

6. The liquid crystal lens according to claim 3, wherein the curved top surface is of a concave shape.

7. The liquid crystal lens according to claim 6, wherein the first alignment layer has an alignment direction parallel to an alignment direction of the second alignment layer.

8. The liquid crystal lens according to claim 7, wherein the first alignment layer and the second alignment layer are arranged immediately adjacent to the liquid crystal layer.

9. The liquid crystal lens according to claim 1, further comprising a spacer arranged between the first substrate and the second substrate so as to maintain a distance between the first substrate and the second substrate.

10. Liquid crystal glasses, comprising:
a frame; and
liquid crystal lenses mounted within the frame;
wherein each of the liquid crystal lenses comprises
a cell defined by a first substrate and a second substrate arranged opposite to each other; wherein the first substrate comprises a first transparent base plate, a first alignment layer arranged at the first transparent base plate and within the cell, and a first transparent electrode arranged at the first transparent base plate; the second substrate comprises a second transparent base plate, and a second alignment layer arranged at the second transparent base plate and within the cell;
a liquid crystal layer arranged between the first substrate and the second substrate and having a uniform thickness between the first substrate and the second substrate;
a transparent pattern layer at an outside of the cell; wherein the transparent pattern layer has a curved top surface and a flat bottom surface, the flat bottom surface is in direct contact with the second transparent base plate of the second substrate; and
a second transparent electrode arranged directly at the curved top surface and at the outside of the cell.

11. The liquid crystal glasses according to claim 10, wherein the liquid crystal lens further comprises a color layer; the color layer is arranged at the cell away from the liquid crystal layer, and
the liquid crystal lens corresponding to a left eye comprises a first color layer, and the liquid crystal lens corresponding to a right eye comprises a second color layer; the first color layer has a color different from, and complementary to, a color of the second color layer.

12. The liquid crystal glasses according to claim 10, wherein the liquid crystal lens further comprises a polarizer; the polarizer is arranged at the cell away from the liquid crystal layer away from the liquid crystal layer; and
the liquid crystal lens corresponding to the left eye comprises a first polarizer, and the liquid crystal lens corresponding to the right eye comprises a second polarizer, and the first polarizer has a transmission axis direction perpendicular to a transmission axis direction of the second polarizer.

13. The liquid crystal glasses according to claim 10, wherein the liquid crystal spectacle further comprises a control module arranged on the frame and configured to control a voltage between the first transparent electrode and the second transparent electrode.

14. The liquid crystal glasses according to claim 10, wherein the liquid crystal lens further comprises at least one power source unit arranged inside the frame.

15. The liquid crystal glasses according to claim 10, wherein the second transparent electrode is in direct contact with the curved top surface, and the whole transparent pattern layer is at the outside of the cell.

16. The liquid crystal glasses according to claim 15, wherein the curved top surface is a continuous smooth curved surface.

17. The liquid crystal glasses according to claim 16, wherein the curved top surface is of a convex shape.

18. The liquid crystal glasses according to claim 16, wherein the transparent pattern layer has a thickness that decreases gradually from a middle portion of the liquid crystal lens towards each edge portion of the liquid crystal lens;
an intensity of an electric field at the middle portion of the liquid crystal lens is expressed as:

$$E_{center} = \frac{V/\varepsilon_{lc}}{\frac{d_{lc}}{\varepsilon_{lc}} + \frac{d_{pattern}}{\varepsilon_{pattern}}};$$

an intensity of an electric field at the edge portion of the liquid crystal lens is expressed as:

$$E_{border} = \frac{V/\varepsilon_{lc}}{d_{lc}/\varepsilon_{lc}} = \frac{V}{d_{lc}}$$

where $E_{center}$ represents the intensity of the electric field at the middle portion of the liquid crystal lens; $E_{border}$ represents the intensity of the electric field at the edge portion of the liquid crystal lens; V represents a voltage applied between the first transparent electrode and the second transparent electrode; $d_{lc}$ represents a thickness of the liquid crystal layer; $\varepsilon_{lc}$ represents a dielectric constant of liquid crystal molecules of the liquid crystal layer; $d_{pattern}$ represents the thickness of the transparent pattern layer; and $\varepsilon_{pattern}$ represents a dielectric constant of the transparent pattern layer.

19. The liquid crystal glasses according to claim 16, wherein the curved top surface is of a concave shape.

20. The liquid crystal lens according to claim 1, wherein the second transparent electrode is in direct contact with the curved top surface.

* * * * *